US008591792B2

(12) United States Patent
Mizuno

(10) Patent No.: US 8,591,792 B2
(45) Date of Patent: Nov. 26, 2013

(54) METHOD OF MOLDING A FIRST RESIN MEMBER ON A SECOND RESIN MEMBER

(75) Inventor: Hirofumi Mizuno, Toyota (JP)

(73) Assignee: Kojima Press Industry Co., Ltd., Toyota-Shi (JP)

( * ) Notice: Subject to any disclaimer, the term of this patent is extended or adjusted under 35 U.S.C. 154(b) by 0 days.

(21) Appl. No.: 12/979,954

(22) Filed: Dec. 28, 2010

(65) Prior Publication Data

US 2012/0161359 A1 Jun. 28, 2012

(51) Int. Cl.
B29C 39/10 (2006.01)

(52) U.S. Cl.
USPC ......... 264/267; 264/268; 264/318; 264/328.8

(58) Field of Classification Search
None
See application file for complete search history.

(56) References Cited

U.S. PATENT DOCUMENTS

| | | | | | |
|---|---|---|---|---|---|
| 4,338,278 | A | * | 7/1982 | Schultz | 264/261 |
| 4,822,553 | A | * | 4/1989 | Marshall | 264/292 |
| 5,478,519 | A | * | 12/1995 | Carrara et al. | 264/267 |
| 6,242,163 | B1 | * | 6/2001 | Stampfl et al. | 430/322 |
| 6,251,325 | B1 | * | 6/2001 | Karlsson | 264/266 |
| 6,739,856 | B2 | * | 5/2004 | Cesano | 425/112 |
| 2004/0101586 | A1 | | 5/2004 | Kamiya | |

FOREIGN PATENT DOCUMENTS

| | | | |
|---|---|---|---|
| JP | 05337982 | * | 12/1993 |
| JP | 2002355848 | | 12/2002 |
| JP | 2005297211 | A | 10/2005 |
| JP | 2006130791 | A | 5/2006 |
| JP | 2006239892 | A | 9/2006 |

OTHER PUBLICATIONS

English abstract of Japanese Application No. JP2002355848 filed Dec. 10, 2002 (1 page).
Japanese Office Action Dated Sep. 24, 2013; Japanese Application No. 2009-297466 (2 p.)
English Translation of Japanese Office Action Dated Sep. 24, 2013; Japanese Application No. 2009-297466 (2 p.).

* cited by examiner

Primary Examiner — Edmund H. Lee
(74) Attorney, Agent, or Firm — Conley Rose, P.C.

(57) ABSTRACT

A method of molding a resin member formed by solidifying molten resin M on a resin member on which molding is to be performed, includes first to third steps. The first step includes setting, on the member on which molding is to be performed, a first mold having a first cavity for molding a portion corresponding to a base portion of the resin member. The second step includes setting, on the first mold, a second mold having a second cavity for molding a portion corresponding to a main body portion of the resin member. The second cavity is formed so as to communicate with the first cavity. The third step includes pouring molten M resin into each of the cavities of both of the molds that have been set, and solidifying the molten resin M thus poured such that it is bonded to the member on which molding is to be performed.

4 Claims, 7 Drawing Sheets

METHOD OF MOLDING A FIRST RESIN MEMBER ON A SECOND RESIN MEMBER

STATEMENT REGARDING FEDERALLY SPONSORED RESEARCH OR DEVELOPMENT

Not applicable.

BACKGROUND OF THE INVENTION

1. Field of the Invention

Embodiments of the invention relate to a resin member molding method and a molding apparatus. More specifically, the invention relates to a method of molding a resin member, formed by solidifying molten resin, on a resin member on which molding is to be performed, and to an apparatus used for carrying out the method.

2. Background of Technology

As a method of mounting a resin design plate to a target member such as a console box of an automobile, there is known a method in which the mounting is effected via, for example, a resin clip. In this connection, Japanese Laid-Open Patent Publication No. 2002-355848 discloses a method in which a plate of a desired configuration is previously molded of resin, and a clip is molded (directly molded) at a desired position on the molded plate. When molding is thus performed, the clip and the plate are formed into an integral structure, so that it is possible to achieve an improvement in terms of workability when mounting the plate to the target member.

However, in the method of Japanese Laid-Open Patent Publication No. 2002-355848 described above, the edge of a plate 130, for example, is curved, and, when a clip is to be molded in the vicinity of a base end of the curved edge, a mold 118 of a molding machine interferes with the curved edge (In FIG. 9, the phantom line indicates the interfering state), so that this method has a problem in that the clip can only be molded at the position on the mold 118 indicated by the solid line in FIG. 9. This problem might be coped with by replacing the mold 118 with another, different mold; in that case, however, it would be necessary to prepare a plurality of molds according to the degree to which the plate 130 is curved, resulting in increase in production cost and low operational efficiency.

Therefore, there is a need in the art for a resin molding method and a molding apparatus that enable to mold a resin member on a different resin member without need of mold replacement.

SUMMARY OF EMBODIMENTS OF THE INVENTIONS

In general, a method of molding a resin member formed by solidifying molten resin on a resin member on which molding is to be performed is taught. Embodiments of the method include a first step of setting, on the member on which molding is to be performed, a first mold having a first cavity for molding a portion corresponding to a base portion of the resin member. Embodiments of the method further include a second step of setting, on the first mold, after the first step, a second mold having a second cavity for molding a portion corresponding to a main body portion of the resin member. The second cavity is formed so as to communicate with the first cavity. Embodiments of the method further include a third step of pouring, after the second step, molten resin into each of the cavities of both of the molds that have been set, and solidifying the poured molten resin such that it is bonded to the member on which molding is to be performed.

According to certain embodiments this method, when molding the resin member on the member on which molding is to be performed, the main body portion of the resin member is formed by the second mold, and the base portion of the resin member is formed by the first mold, so that it is possible to perform the molding, with the resin member increased in height by the height of the base portion. Thus, even in the case where, as described in connection with the known technique, the edge of the member on which molding is to be performed is curved, and where the resin member is to be molded in the vicinity of the base end of the curved edge, the second mold may not interfere with the curved edge. Thus, there is no need to replace the second mold, and it is possible to mold the resin member in the vicinity of the base end of the curved edge. Further, as described above, it is possible to perform molding on the member on which molding is to be performed, with the resin member increased in height, so that even in a case where, for example, the target member requires an increase in the height of the resin member, the requirement can be met without having to replace the second mold.

An apparatus for molding a resin member, formed by solidifying molten resin, on a resin member on which molding is to be performed, includes a base on which the member on which molding is to be performed can be set; a first mold capable of being set on the member on which molding is to be performed that has been set on the base; and a second mold capable of being set on the first mold. The, the first mold has a first cavity for molding a portion corresponding to a base portion of the resin member. The second mold has a second cavity for forming a portion corresponding to a main body portion of the resin member. The second cavity is formed so as to communicate with the first cavity. Molten resin may be poured into the cavities of both of the molds, with the first mold set on the member on which molding is to be performed and which has been set on the base, and with the second mold set on the first mold thus set. The poured molten resin is solidified so as to be bonded to the member on which molding is to be performed.

Also according to this apparatus, it is possible to attain the same advantages as the method described above.

DETAILED DESCRIPTION OF EMBODIMENTS OF THE INVENTIONS

Figure 1:
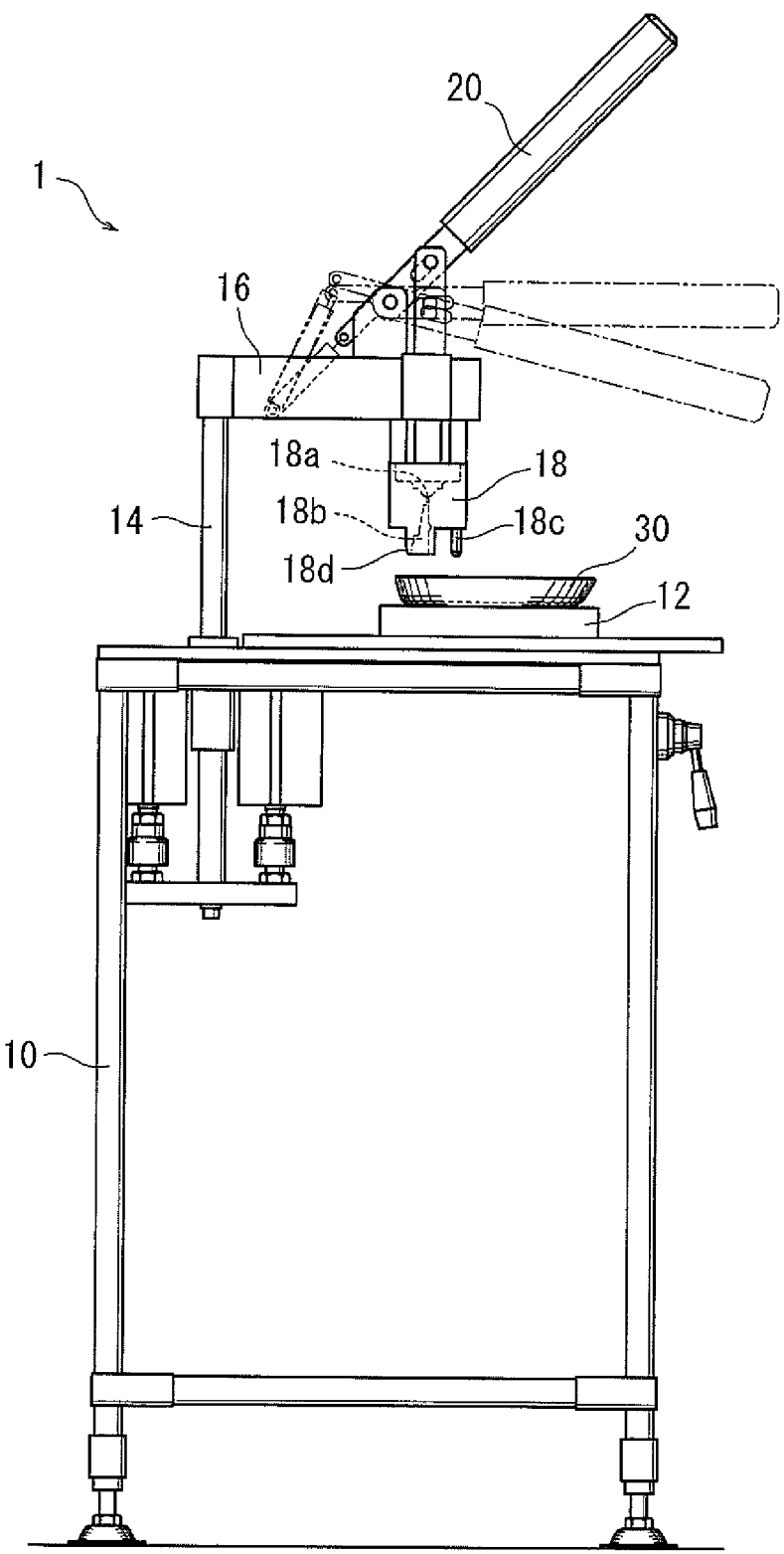
FIG. 1 is a front view of a resin member molding apparatus according to an example.

Each of the additional features and teachings disclosed above and below may be utilized separately or in conjunction with other features and teachings to provide improved methods and apparatus for molding resin members. Representative examples of the invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings.

An example will be hereinafter described with reference to FIGS. 1 through 8. In the example described bellow, a resin plate 30 serves as a resin member on which molding is to be performed. Similarly, in the example described below, a clip 36 used when the resin plate 30 is mounted to a target member, to which the resin plate 30 is mounted, serves as a resin member. First, referring to FIG. 1, the construction of a direct molding machine 1, which is an example of a molding apparatus will be described.

Numeral 10 indicates a frame constituting the base of the direct molding machine 1. Numeral 12 indicates a base placed on the top surface of the frame 10. The base 12 is used to set the resin plate 30 in order to mold the clip 36 on the resin plate 30 described below. Numeral 14 indicates a pole extending upward from the top surface of the frame 10. The pole 14 is used to vertically slide a mounting frame 16 described below.

Numeral 16 indicates the mounting frame. Assembled to the mounting frame 16 is a mold 18 for molding the clip 36 on the resin plate 30. Further, assembled to the mounting frame 16 is a handle 20 used for injecting molten resin M into a cavity 18*b* of the mold 18.

Numeral 18 indicates the mold. Formed in the mold 18 are a nozzle 18*a* allowing injection of the molten resin M, and the cavity 18*b* to be filled with the molten resin M injected from the nozzle 18*a*. The cavity 18*b* is configured to mold a main body portion 36*a* of the clip 36. The cavity 18*b* is formed such that, when the mold 18 is set on a jig 40 described below, it communicates with a through-hole 42*b* of one of molds 42 described below.

The mold 18 has a pin 18*c* that can be inserted into a hole 42*c* formed in each of the molds 42 of the jig 40 described below.

The direct molding machine 1 is constituted by the frame 10, the base 12, the pole 14, the mounting frame 16, the mold 18, and the handle 20.

Figure 2:
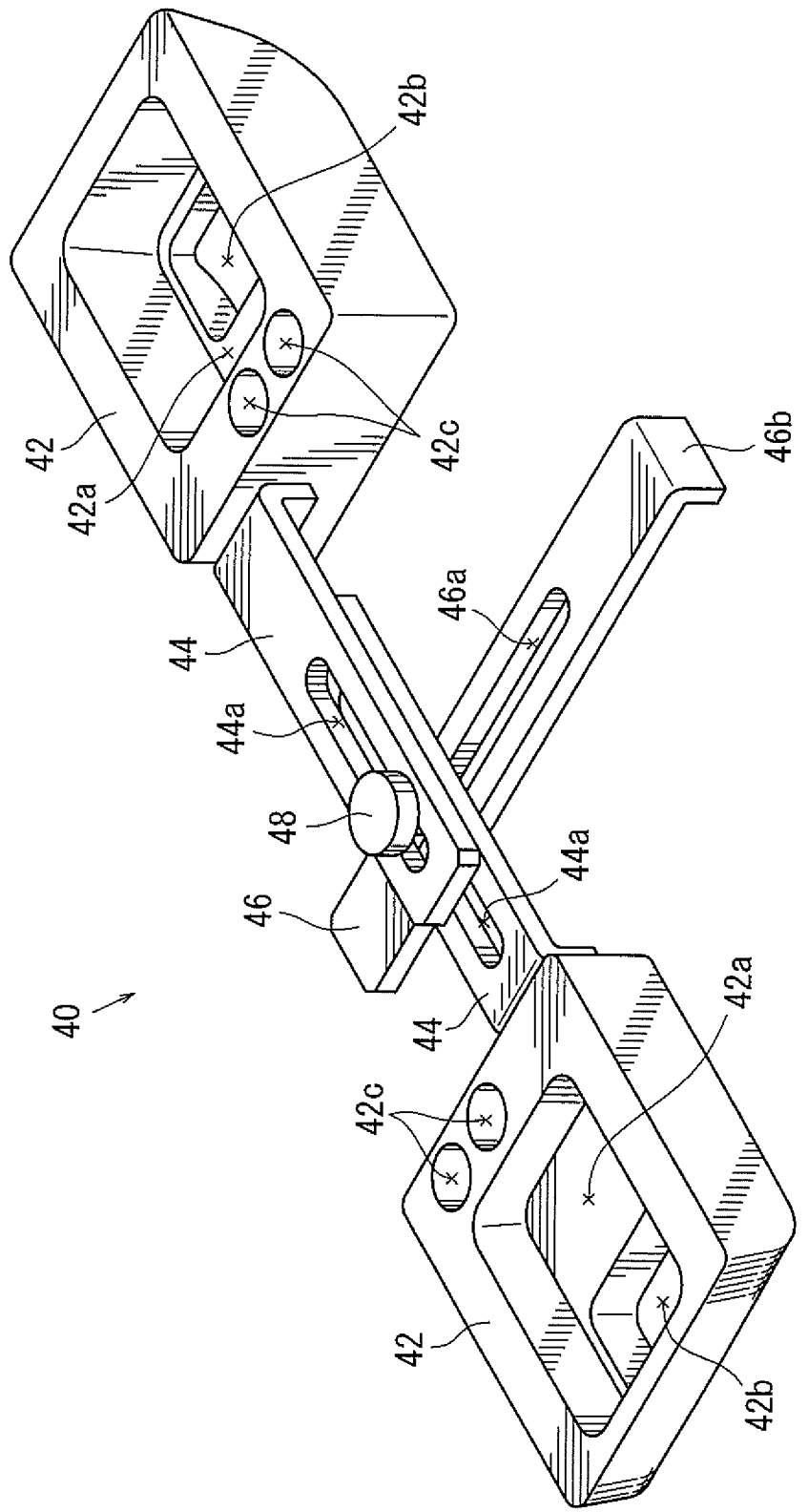
FIG. 2 is a general perspective view of a jig employed when using the molding apparatus shown in FIG. 1.

Next, the construction of the jig 40 will be described with reference to FIG. 2. The jig 40 is composed of two molds 42, and a connection bar 46 assembling the two molds 42 together. The molds 42 serve as a first mold. Each mold 42 has a recess 42*a* in the upper surface thereof. This enables each mold 42 to receive the forward end of the mold 18.

In a part of the bottom surface of each recess 42*a*, there is formed a through-hole 42*b* vertically extending therethrough. The through-hole 42*b* is the cavity for molding the base portion (proximal portion) of the clip 36. The through-hole 42*b* serves as a first cavity. Further, a support bar 44 is formed on each mold 42 for assembling with the connection bar 46. The support bar 44 has an elongated hole 44*a* extending in the longitudinal direction thereof. Further, each of the molds 42 has holes 42*c* into which the pin 18*c* of the mold 18 described above can be fitted.

The connection bar 46 also has an elongated hole 46*a* extending in the longitudinal direction thereof. The connection bar 46 has at one end thereof an L-shaped bent portion 46*b*.

A bolt 48 is inserted into the elongated hole 46*a* of the connection bar 46 and into the elongated holes 44*a* of the support bars 44 formed on the molds 42, and, in the inserted state, the bolt 48 is threadedly engaged with a nut 50 (not shown in FIG. 2) to assemble the molds 42 to the connection bar 46, thus forming the jig 40. At this time, as is apparent also from FIG. 2, the two molds 42 are assembled to the connection bar 46 such that they are respectively situated on opposite sides with respect to the connection bar 46 while being oriented in opposite directions.

When the threaded engagement between the bolt 48 and the nut 50 is loosened, it is possible to slide the two molds 42 in the longitudinal direction of the connection bar 46 and in the longitudinal direction of the support bar 44. And, after the molds 42 have been slid to desired positions, the threaded engagement of the bolt 48 and the nut 50 is tightened, whereby it is possible to effect positioning of the two molds 42 at desired positions with respect to the connection bar 46.

The jig 40 is constituted by the two molds 42 and the connection bar 46.

Next, a method of molding three clips 36 on the resin plate 30 by using the direct molding machine 1 and the jig 40 described above will be described with reference to FIGS. 3 through 8. First, the resin plate 30 is previously molded by another molding machine (not shown). As in the case of the resin design plate described in connection with the known art, the resin plate 30 is formed so as to have a curved edge.

Figure 3:
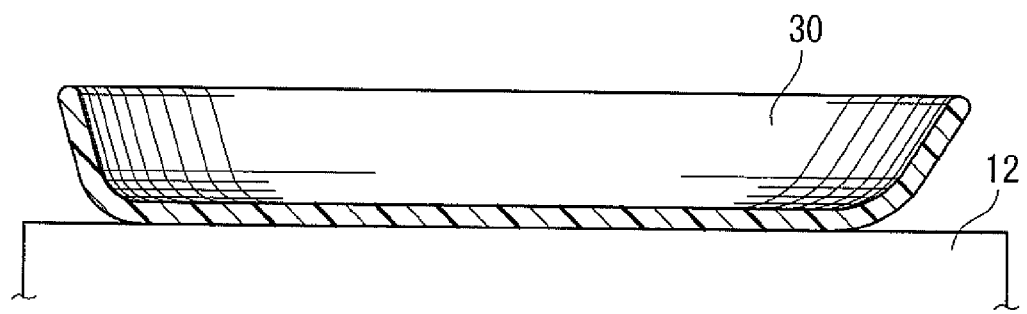
FIG. 3 is a schematic vertical sectional view of a main aspect of a molding step performed by using the molding apparatus shown in FIG. 1, and showing a resin plate set on a base.
Figure 4:
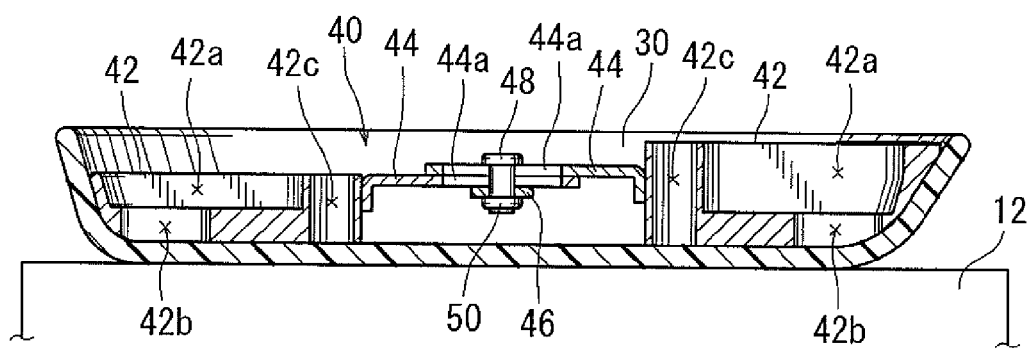
FIG. 4 is a view illustrating a step subsequent to the step shown in FIG. 3, and showing a jig set on the resin plate.
Figure 5:
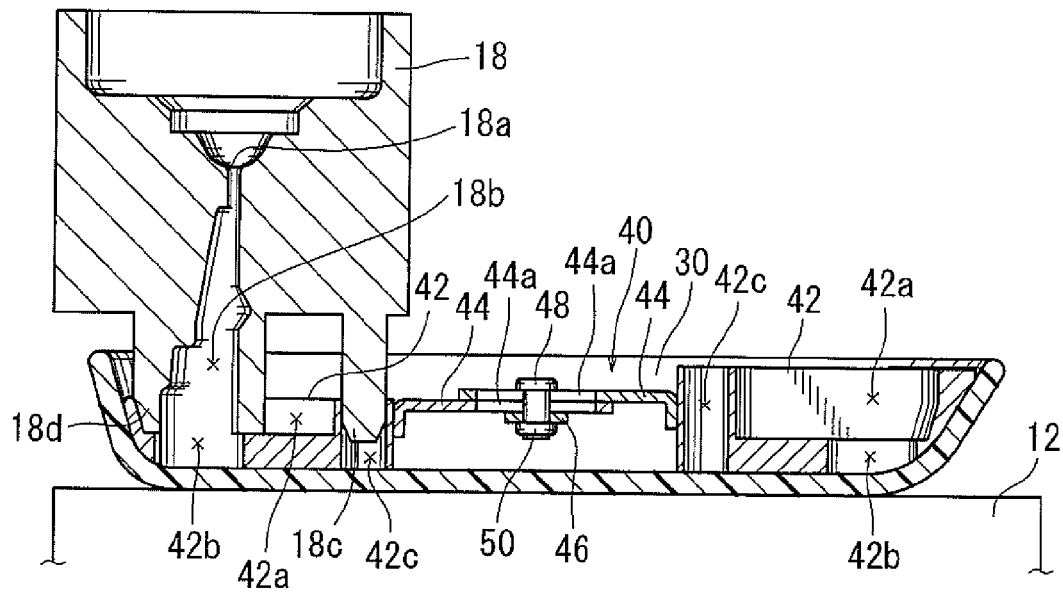
FIG. 5 is a view illustrating a step subsequent to the step shown in FIG. 4, and showing a mold set on the jig.
Figure 6:
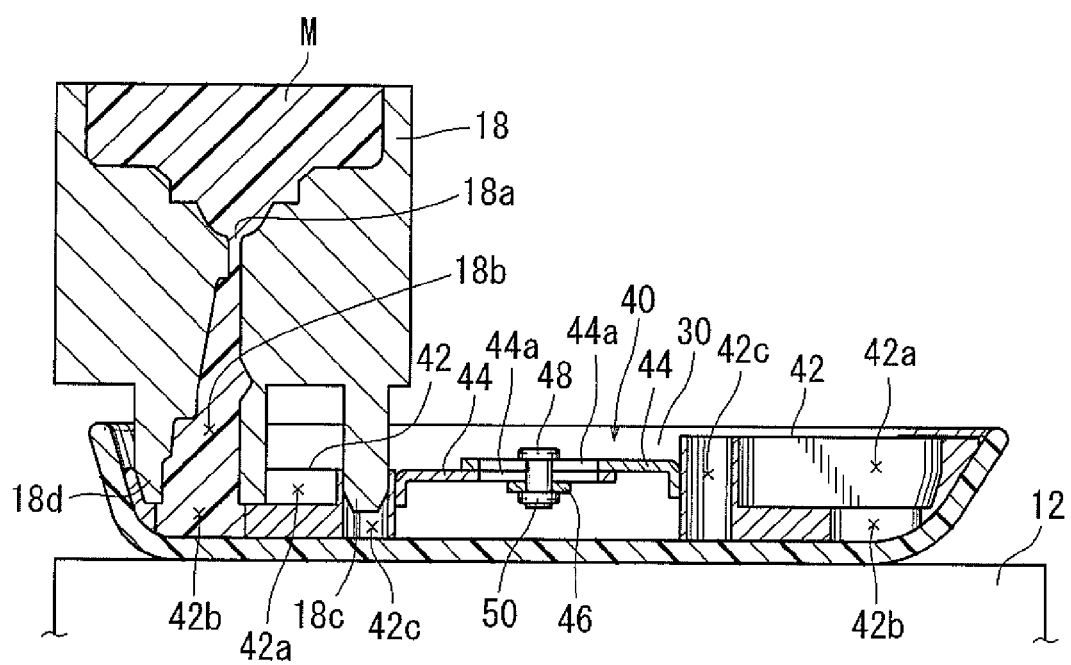
FIG. 6 is a view illustrating a step subsequent to the step shown in FIG. 5, and showing the state where molten resin is injected.
Figure 7:
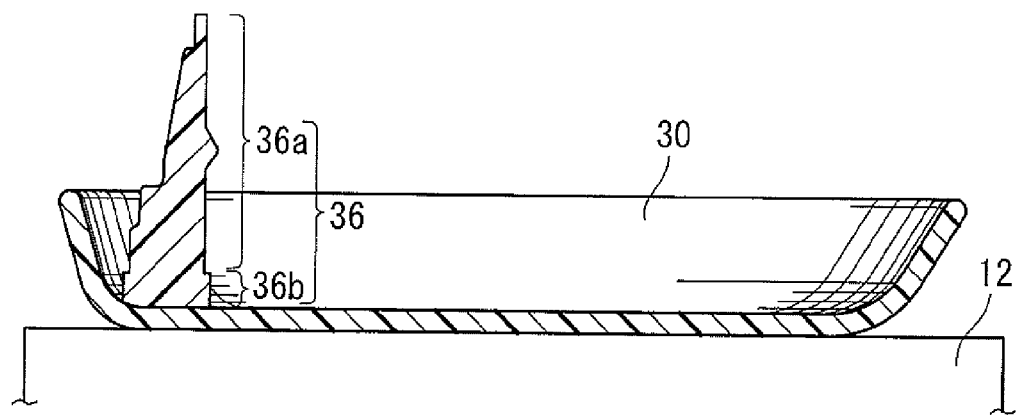
FIG. 7 is a view illustrating a step subsequent to the step shown in FIG. 6, and showing the state where the mold is opened and the jig is removed.

The resin plate 30 is set on the base 12 of the direct molding machine 1 (See FIG. 3). Next, the bent portion 46*b* of the connection bar 46 is hooked on the edge of the resin plate 30, and, in this state, the jig 40 is set on the resin plate 30. At this time, the jig 40 is set on the resin plate 30 so that the two molds 42 are positioned at positions where the clips 36 are to be molded. As in the case described in connection with the known art, in this embodiment, the jig 40 is set on the resin plate 30 such that the clips 36 are molded in the vicinity of the base end of the curved edge (See FIG. 4).

Next, the mounting frame 16 is lowered, so that a leading end 18*d* of the mold 18 enters the recess 42*a* of one of the molds 42. At this time, the leading end 18*d* of the mold 18 enters the recess 42*a* of the mold 42 such that the pin 18*c* is fitted into the hole 42*c* of the mold 42. As a result, the mold 18 is positioned relative to the mold 42, so that the through-hole 42*b* of the mold 42 and the cavity 18*b* of the mold 18 communicate with each other (See FIG. 5). The mounting frame 16 may be lowered such that the resin plate 30 receives a pressure if needed or desired.

Next, the handle 20 is operated for injecting the molten resin M from the nozzle 18*a* of the mold 18 into the cavity 18*b* and further into the through-hole 42*b*. After that, the molten resin M that has been injected is solidified so as to be bonded to the resin plate 30 (See FIG. 6). Next, the mounting frame 16 is raised and the leading end 18*d* of the mold 18 is retreated from the recess 42*a* of the mold 42 to detach the jig 40 from the resin plate 30 (See FIG. 7). In this way, it is possible to mold the clip 36 on the resin plate 30.

Figure 8:
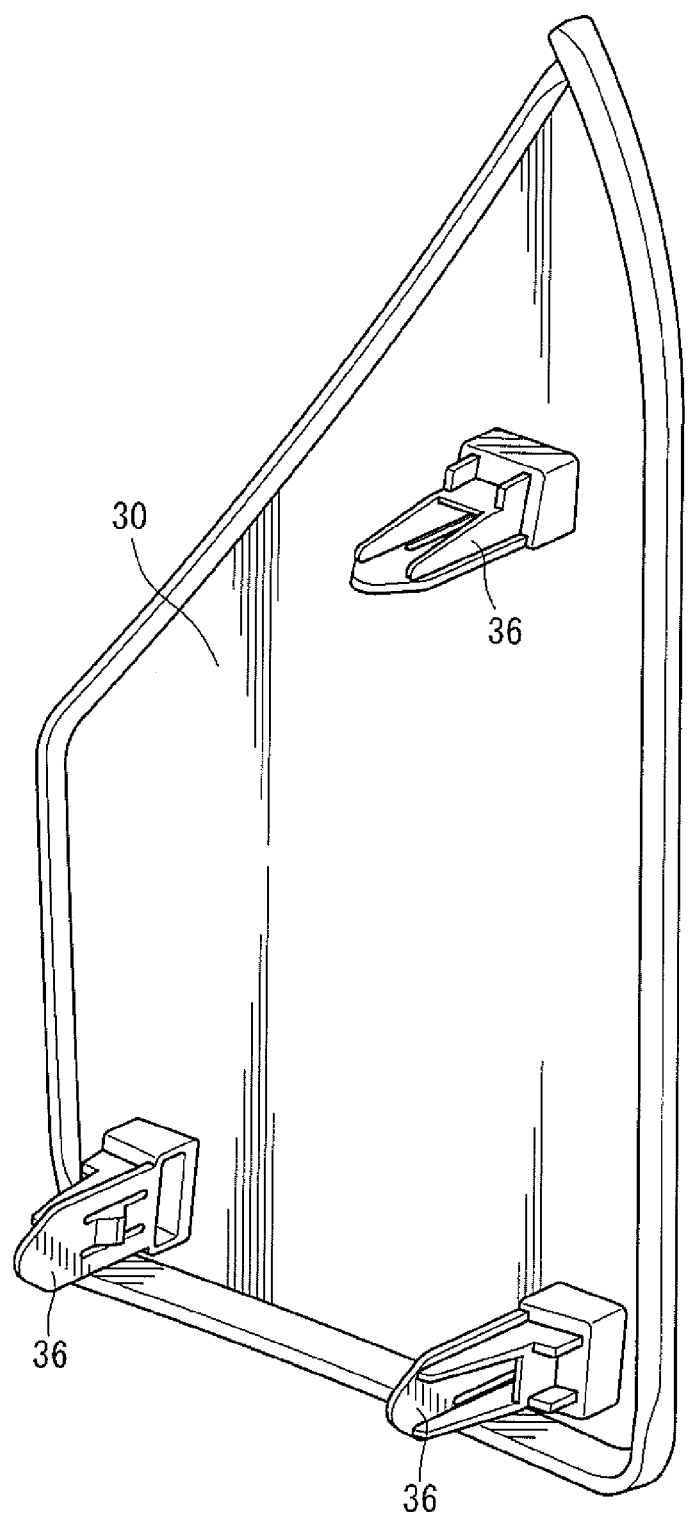
FIG. 8 is a general perspective view of a resin plate molded by the steps shown in FIGS. 3 through 7.

Subsequently, the resin plate 30 is changed in its orientation, and is set on the base 12 of the direct molding machine 1 again. And, the above operations described with reference to FIGS. 3 through 7 are repeated to mold two additional clips 36 on the resin plate 30. In this way, it is possible to mold three clips 36 on the resin plate 30 (See FIG. 8). In FIG. 8, the left lower clip 36 as seen in this figure is the one molded by the steps described with reference to FIGS. 3 through 7.

Figure 9:
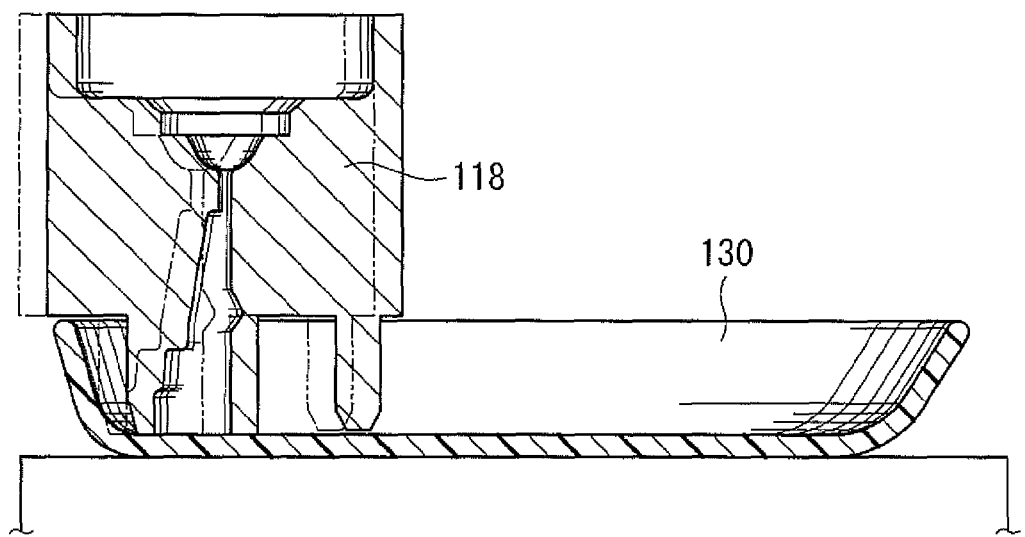
FIG. 9 is a view illustrating a known method.

According to the molding method of this example, when molding the clips 36 on the resin plate 30, the main body portions 36a of the clips 36 are molded by the mold 18, and the base portions 36b of the clips 36 are molded by the jig 40, so that it is possible to mold the clips 36 on the resin plate 30 while increasing their height by the height of the base portions 36b. Thus, even when the edge of the resin plate 30 is curved, and the clips 36 are to be molded in the vicinity of the base end of the curved edge, the mold 18 of the direct molding machine 1 may not interfere with the curved edge. That is, it is possible to set the mold 18 so as to be horizontally in conformity with the mold indicated by the phantom line in FIG. 9 illustrating the known art. Thus, it is possible to mold the clips 36 in the vicinity of the base end of the curved edge without need of replacing the mold 18. Further, as described above, it is possible to mold the clips 36 on the resin plate 30 while increasing them in height, so that even if the target member requires, for example, increase in the height of the clips 36, the requirement can be met without need of replacing the mold 18.

According to the molding apparatus of this example, it is possible to attain the same advantages as those of the above-described molding method.

The invention claimed is:

1. A method of molding a first resin member on a second resin member, comprising:
   a first step of setting a first mold on the second resin member, wherein the first mold has a first cavity for molding a base portion of the first resin member;
   a second step of setting, after the first step, a second mold, wherein the second mold has a second cavity for molding a main body portion of the first resin member, the second cavity being formed so as to communicate with the first cavity;
   a third step of pouring, after the second step, molten resin into each of the cavities of both of the molds that have been set, and solidifying the poured molten resin such that it is bonded to the second member; and
   providing a jig;
   wherein the first mold is mounted to the jig; and
   wherein the first step further comprises positioning the first mold relative to the second resin member by engaging the jig with the second resin member.

2. The method of claim 1, wherein the third step comprises pouring the molten resin into the second cavity, such that the molten resin flows into the first cavity, whereby the first cavity and the second cavity are both filled within the molten resin.

3. The method of claim 1, further comprising:
   providing a pin on the second mold; and
   providing a hole on the first mold, wherein the hole is configured to receive the pin;
   wherein the second step further comprises positioning the second mold relative to the first mold by inserting the pin of the second mold into the hole of the first mold.

4. A method of molding a plurality of first resin members on a second resin member, each of the first resin members including a first portion and a second portion, the method comprising:
   (i) providing a jig having a plurality of first molds mounted thereto, each of the plurality of first molds having a first cavity configured to mold the first portion of the first resin member;
   (ii) providing a second mold having a second cavity configured to mold the second portion of the first resin member;
   (iii) positioning the plurality of first molds of the jig relative to each other;
   (iii) positioning the jig relative to the second resin member;
   (iv) positioning the second mold relative to the jig, so that the second cavity communicates with the first cavity of one of the plurality of first molds;
   (v) pouring molten resin into the second cavity of the second mold, such that the molten resin flows into the first cavity of the one of the plurality of first molds, whereby the first cavity of the one of the plurality of first molds and the second cavity are both filled with molten resin;
   (vi) solidifying the poured molten resin to form one of the plurality of first resin members on the second resin member;
   (vii) moving the second mold relative to the jig and the second resin member, so that the second mold is positioned to communicate with the first cavity of another one of the plurality of first molds, and repeating steps (v) and (vi) to form another one of the plurality of first resin members on the second resin member; and
   (viii) repeating step (vii) until the plurality of first resin members are molded on the second resin member.

* * * * *